(12) United States Patent
Leppanen

(10) Patent No.: US 6,981,855 B2
(45) Date of Patent: Jan. 3, 2006

(54) DRILLING RIG HAVING A COMPACT COMPRESSOR/PUMP ASSEMBLY

(75) Inventor: Jarmo Leppanen, Gainesville, FL (US)

(73) Assignee: Sandvik AB, Sandviken (SE)

( * ) Notice: Subject to any disclaimer, the term of this patent is extended or adjusted under 35 U.S.C. 154(b) by 16 days.

(21) Appl. No.: 10/259,308

(22) Filed: Sep. 30, 2002

(65) Prior Publication Data

US 2004/0060717 A1    Apr. 1, 2004

(51) Int. Cl.
    *F01C 11/00*    (2006.01)
(52) U.S. Cl. ............... 418/201.1; 418/199; 417/199.1
(58) Field of Classification Search ............... 173/28, 173/43, 26; 418/199, 201.1; 417/199.1
    See application file for complete search history.

(56) References Cited

U.S. PATENT DOCUMENTS

| 3,809,344 | A | * | 5/1974 | Kolderup et al. ............... 173/28 |
| 4,171,188 | A | * | 10/1979 | Anderson et al. ............ 417/282 |
| 4,315,553 | A | * | 2/1982 | Stallings ............... 175/207 |
| 4,371,041 | A | * | 2/1983 | Becker et al. ............... 173/28 |
| 5,697,763 | A | * | 12/1997 | Kitchener ............... 417/28 |
| 6,478,560 | B1 | * | 11/2002 | Bowman ............... 418/199 |
| 6,488,488 | B2 | * | 12/2002 | Achtelik et al. ......... 418/201.1 |
| 6,860,730 | B2 | * | 3/2005 | Leppanen ............... 418/201.2 |

* cited by examiner

*Primary Examiner*—Stephen F. Gerrity
*Assistant Examiner*—Michelle Lopez
(74) *Attorney, Agent, or Firm*—Drinker Biddle & Reath LLP

(57) ABSTRACT

A mobile drilling rig includes a platform mounted on drivable ground supports. Drilling equipment is disposed on the platform and is operated by a power system that includes hydraulic pumps, a screw type air compressor, and a motor for driving the pumps and the compressor. A gearbox is common to the hydraulic pumps and the air compressor and includes an intermeshing gear arrangement for transmitting an inputted power from the motor to the pumps and the compressor. Compressed air from the compressor travels to an air reservoir in which compressor oil is separated from the air. The compressor oil is conducted to an oil inlet of the gearbox and is circulated through the gearbox to an oil outlet of the gearbox which communicates with an air inlet of the compressor.

12 Claims, 5 Drawing Sheets

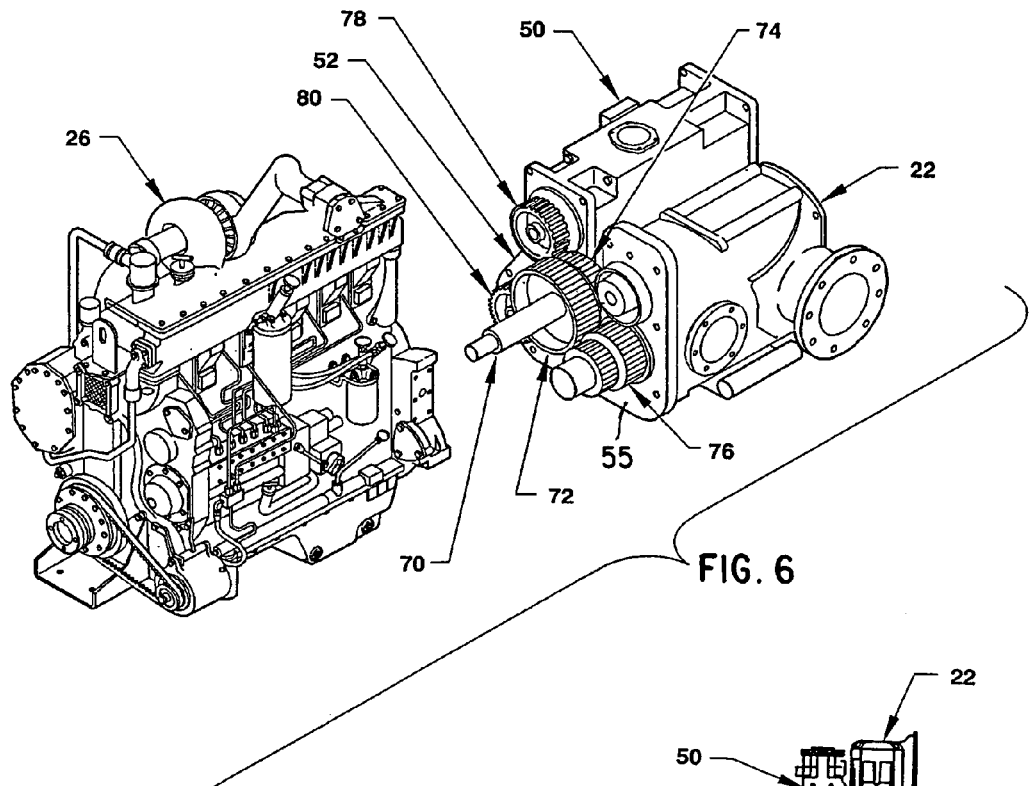
FIG. 6
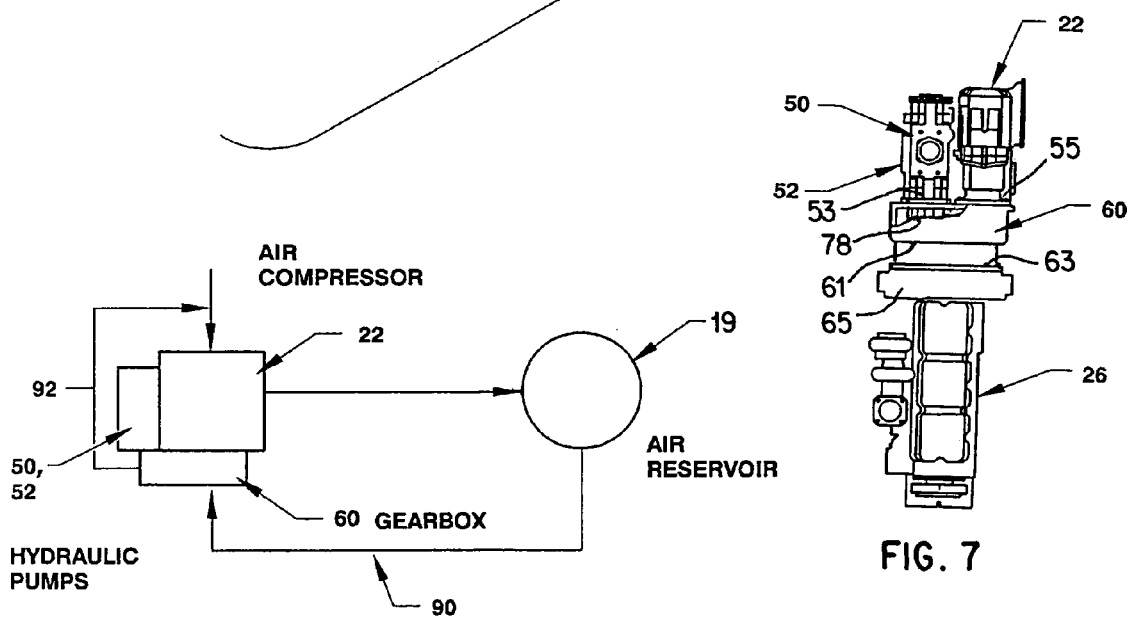
FIG. 7
FIG. 8

DRILLING RIG HAVING A COMPACT COMPRESSOR/PUMP ASSEMBLY

BACKGROUND OF THE INVENTION

The present invention relates to mobile drilling rigs and, in particular, to an arrangement of a motor, an air compressor and hydraulic pumps on a mobile drilling rig.

A conventional mobile, steerable drilling rig 10, depicted in FIGS. 1 and 2, compresses a platform 12 below which a drivable ground support is attached, such as a pair of rotatable wheels (not shown) or two rotatable endless carrier tracks 14, disposed on respective sides of the platform. An operator's cab 16 is disposed at a rear end of the platform. Situated on the platform in front of the cab 16 is a drilling assembly 17 for drilling holes downwardly into the ground. The drilling assembly 17 includes a swingable beam 18, such as a mast whose lower end is pivotably connected to a fixed pedestal 18a to be swingable about a horizontal axis extending perpendicularly to a front-to-rear extending longitudinal axis A of the rig. Thus, the mast 18 can be swung by hydraulic devices 21 from the vertical state depicted in FIG. 1 to a horizontal state (not shown) in which the free end of the mast sits on a mast rest 20 disposed at a front end of the platform.

The mast is oriented horizontally when tramming, i.e., when driving the rig from one site to another. On the other hand, the mast is oriented vertically during a drilling operation. Mounted on the mast is a hydraulically powered raising/lowering mechanism for raising or lowering a drill string having a drill bit at its lower end. The drill string is comprised of series of interconnected drill rods that are stored in a carousel mounted on the mast. Hydraulic devices such as motors or cylinders are provided for rotating the carousel.

Hydraulic pumps 27 are provided (FIG. 3) for providing pressurized fluid to the various hydraulic devices and hydraulic motors.

In order to flush cuttings from a hole as it is being drilled, it is common to direct compressed air downwardly through the drill string to the front face of the drill bit. The cuttings become entrained in the airflow and are brought to the surface as the air travels upwardly along the annulus surrounding the exterior of the drill string. The compressed air also serves to cool the cutting elements of the drill bit. The compressed air is produced by a compressor, typically a screw compressor 22. The compressor delivers compressed air to an air reservoir 19 (see FIG. 4) from which it is conducted to the drill string. Lubricating oil is mixed with the compressed air for lubricating the compressor. The lubricating oil is separated from the compressed air within the reservoir 19 and is conducted back to the compressor and the compressor gear box 22a through a conduit 19a, as depicted in FIG. 4. The oil is propelled through the conduit 19a by a pressure difference between the reservoir and the gearbox. The oil is then sucked out of the gear box 22a and into the compressor inlet through a conduit 19b.

In order to drive the screw compressor 22 and the hydraulic pumps 27, it is conventional to employ a motor 26, such as a fuel-driven engine (e.g., a diesel engine) or an electric motor for example. In a typical arrangement, the compressor 22 the motor 26, the motor drive shafts, the pumps 27, and gearboxes for the compressor and the pumps are laid out in a line extending parallel to the longitudinal axis of the rig, as shown in FIGS. 2 and 3.

The gearing 23 on the compressor is disposed in a gearbox situated between the rear fly wheel end of the motor and the compressor, as shown in FIG. 3. A main gear 23a of the gearing is driven by the motor and it, in turn, drives the compressor screws through additional gears of the gearing 23.

Projecting in front of the engine is a first driveline 24 (see FIG. 3) which drives a first pump drive gearbox 24a of first hydraulic pump assembly 24b which provides pressurized hydraulic fluid for driving the tracks 14 (tramming). A second driveline 25 drives second pump drive gearbox 25b of a second hydraulic pump mechanism 25a which provides pressurized fluid for carrying out the drilling functions and driving the cooling system for cooling the diesel engine 26, the compressor oil, and the hydraulic oil.

It will be appreciated that the location of the center of gravity of the load supported by the carrier tracks 14 is defined by the layout of the equipment disposed on the platform.

From the standpoint of the design and cost of the carrier tracks 14, it would be desirable for the center of gravity to be centered above the carrier tracks, i.e., be located as closely as possible to a midpoint between the front and rear axles of each track (as the rig is viewed from the side, as in FIG. 1). In that way, each axle would have to be designed to support only about one-half of the load. If, instead, the center of gravity of the load were closer to one of the axles, that axle would have to support more than one-half of the load. Hence, the tracks would have to be oversized for carrying a greater load which is more costly and may result in rig stability problems when tramming. Also, track life is shortened due to the uneven weight distribution. The severity of those problems is dependent upon the distance by which the center of gravity is offset from the midpoint.

On the other hand, from the standpoint of drilling efficiency, it is preferred that the center of gravity be disposed as close to the mast carrier as possible, in order to maximize the pull-down force acting downwardly on the drill bit during a drilling operation.

Therefore, it will be appreciated that the location of the optimum center of gravity of the load is a design compromise between the above-discussed considerations. However, in current drilling rigs there is little versatility in the selection of the optimum location of the center of gravity when manufacturing the rig. That is, as noted above, the motor 26, the screw compressor 22, the hydraulic pump assemblies 24a, 25b, and the gearboxes therefor, occupy such a large portion of the front-to-rear dimension of the platform that there is little ability to adjust the center of gravity.

It would be desirable, therefore, to provide a way of making the design of a drilling rig more versatile from the standpoint of determining the location of the center of gravity of the load supported by the tracks 14.

The gearboxes 24a, 25a of the first and second pump assemblies 24b, 25b are flooded with a fixed quantity of relatively heavy lubricating gear oil which can lead to power loss and difficult start-ups in cold weather, and periodic servicing is required to replace the oil. Pump drive gear boxes on the drill rigs are high maintenance and cost items. Such shortcomings are not present in connection with the compressor gearbox in which thin compressor lubricating oil is continuously circulated therethrough via conduits 23a, 23b (FIG. 3) for lubricating and cooling the gear box, i.e., a so-called "dry" gearbox.

It would be desirable:

to lubricate and cool the hydraulic pump gearings in a manner which reduces the power losses, to ease the difficult diesel engine start-ups, to eliminate the need for replacing the lubricating oil in the pump drive gear boxes, to eliminate expensive, complicated, high maintenance and cost items, to simplify the overall power train design and construction, and to reduce the size of the power unit comprised of the diesel engine, the compressor, and the hydraulic pumps

SUMMARY OF THE INVENTION

The present invention relates to an apparatus which includes a hydraulic pump, an air compressor lubricated by compressor oil, and a gearbox common to the hydraulic pump and the air compressor and including an intermeshing gear arrangement for transmitting an inputted power to the hydraulic pump and the air compressor. The gearbox includes an oil inlet connected to a source of the compressor oil, and also includes an oil outlet. The oil inlet is at a higher pressure than the oil outlet, wherein compressor oil is circulated through the gearbox while inputted power is transmitted to the gear arrangement.

Preferably, the oil outlet is connected to an inlet of the compressor which provides suction for sucking compressor oil out of the gearbox.

Preferably, the source of compressor oil is a reservoir which receives compressed air from the compressor and separates compressor oil therefrom.

The invention also pertains to a mobile drilling rig which includes the above described apparatus.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 6 is an exploded perspective view of a motor, compressor, and pump arrangement according to the present invention.

FIG. 7 is a top plan view of the motor, compressor, and pump arrangement according to the present invention.

FIG. 8 is a schematic diagram similar to FIG. 4, pertaining to the present invention.

DESCRIPTION OF A PREFERRED EMBODIMENT OF THE INVENTION

Figure 1:
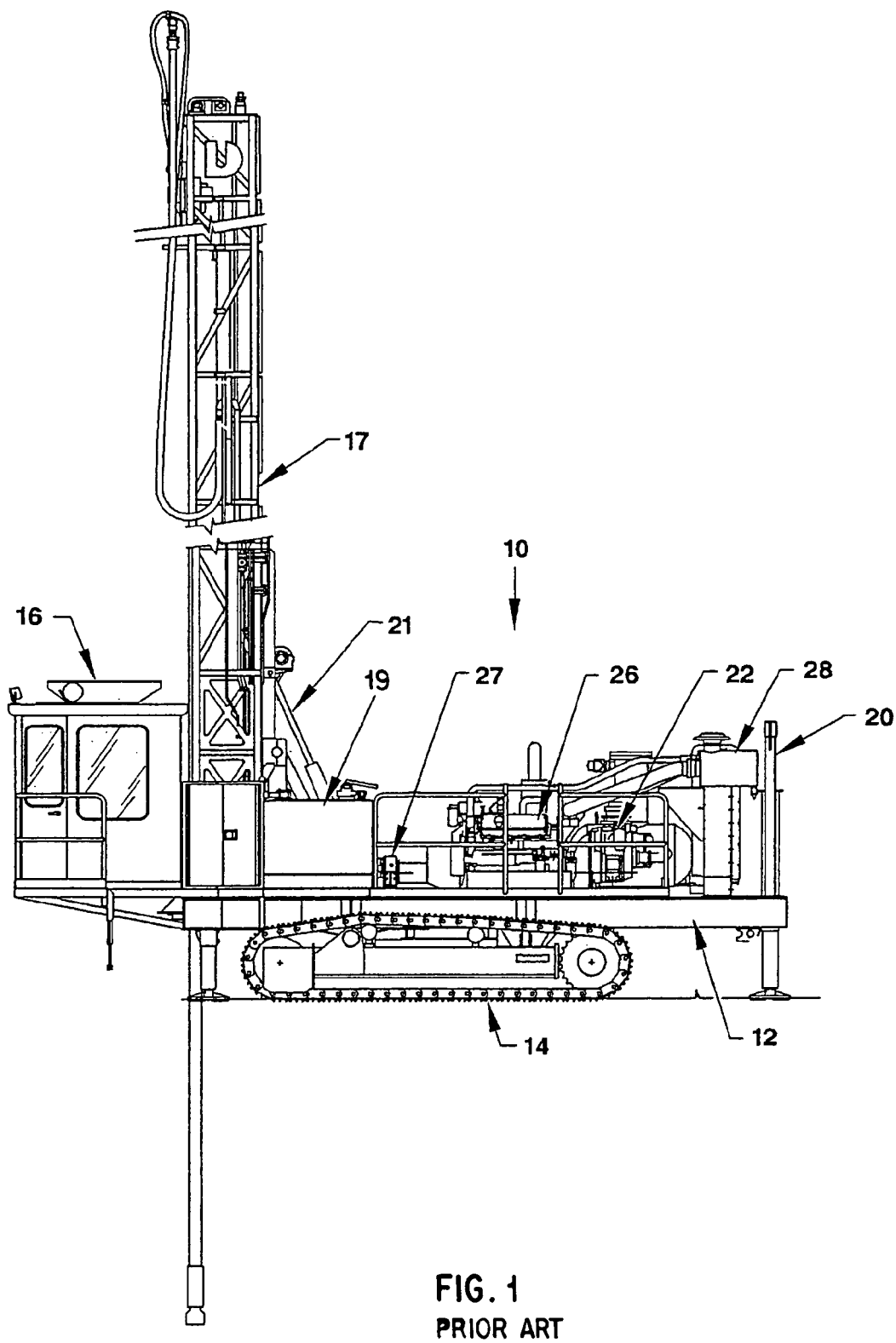
FIG. 1 is a side elevational view of a conventional drilling rig.
Figure 2:
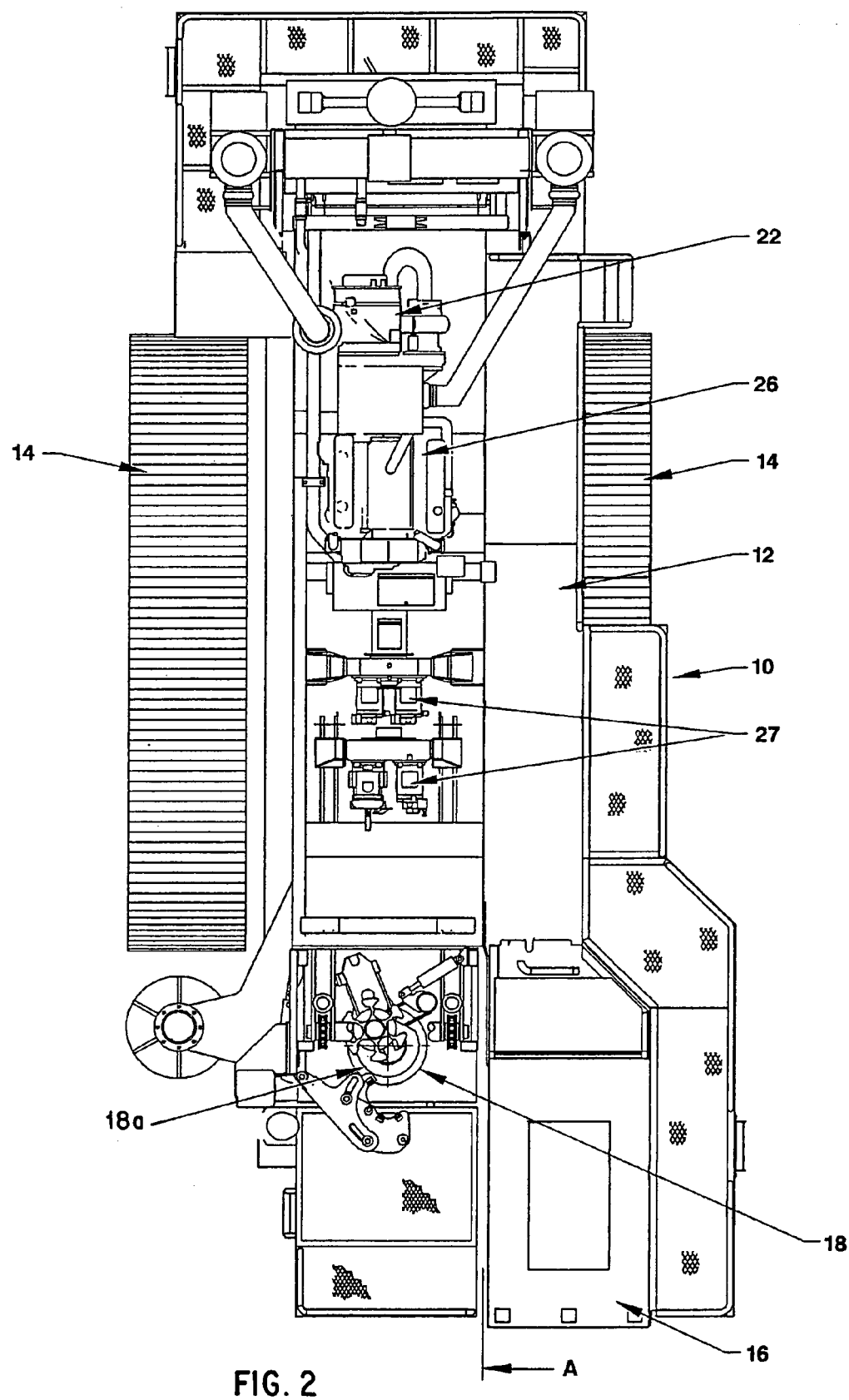
FIG. 2 is a top plan view of a conventional drilling rig.
Figure 3:
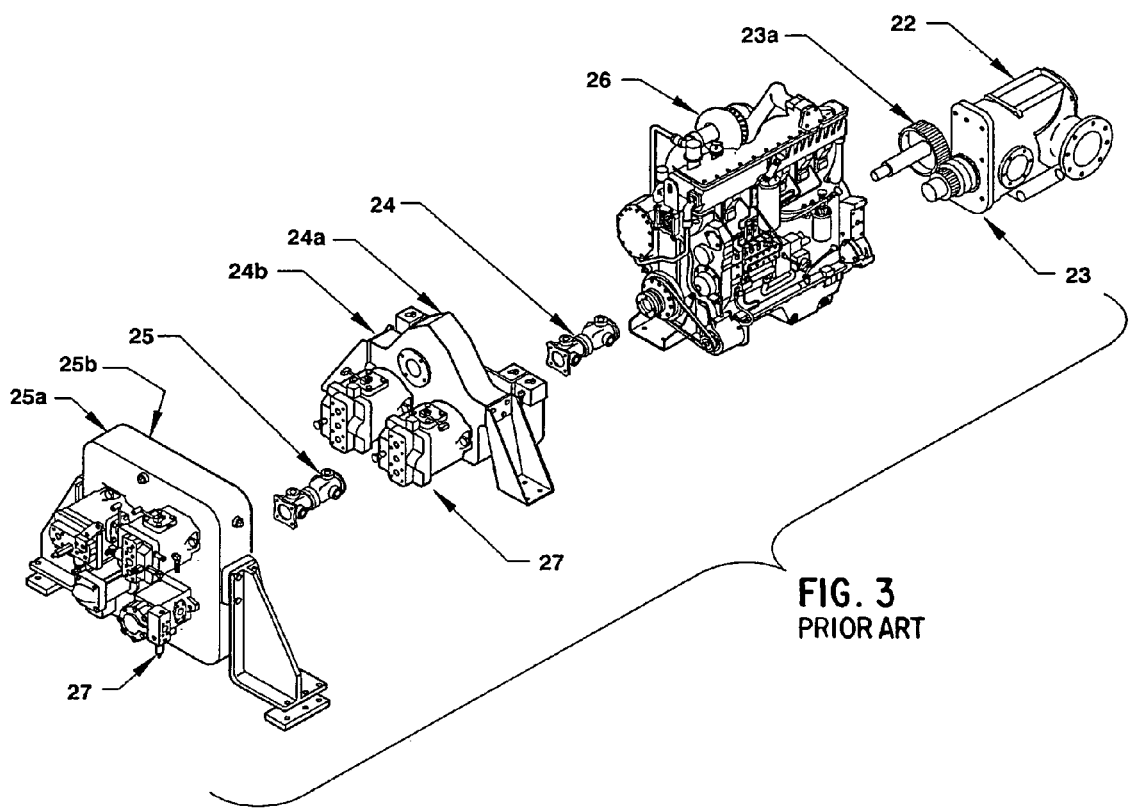
FIG. 3 is an exploded perspective view of a diesel motor, screw compressor, hydraulic pump arrangement on a conventional drilling rig.
Figure 4:
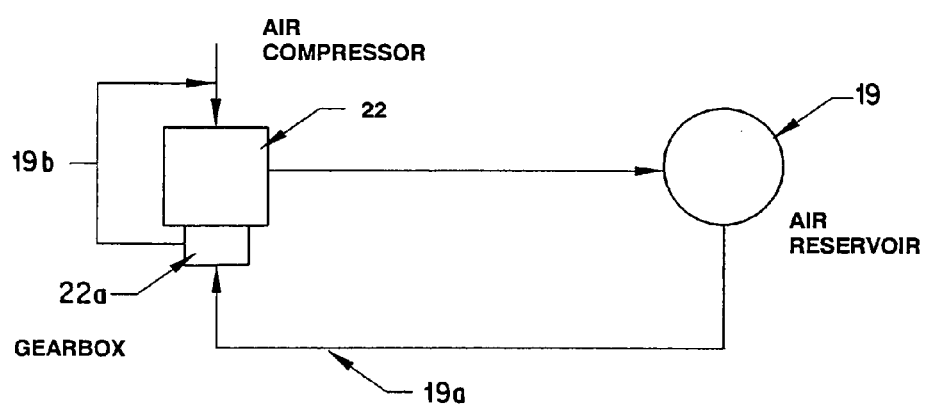
FIG. 4 is a schematic diagram of the flow of air from a compressor and lubrication oil to the compressor on a conventional drilling rig.
Figure 5:
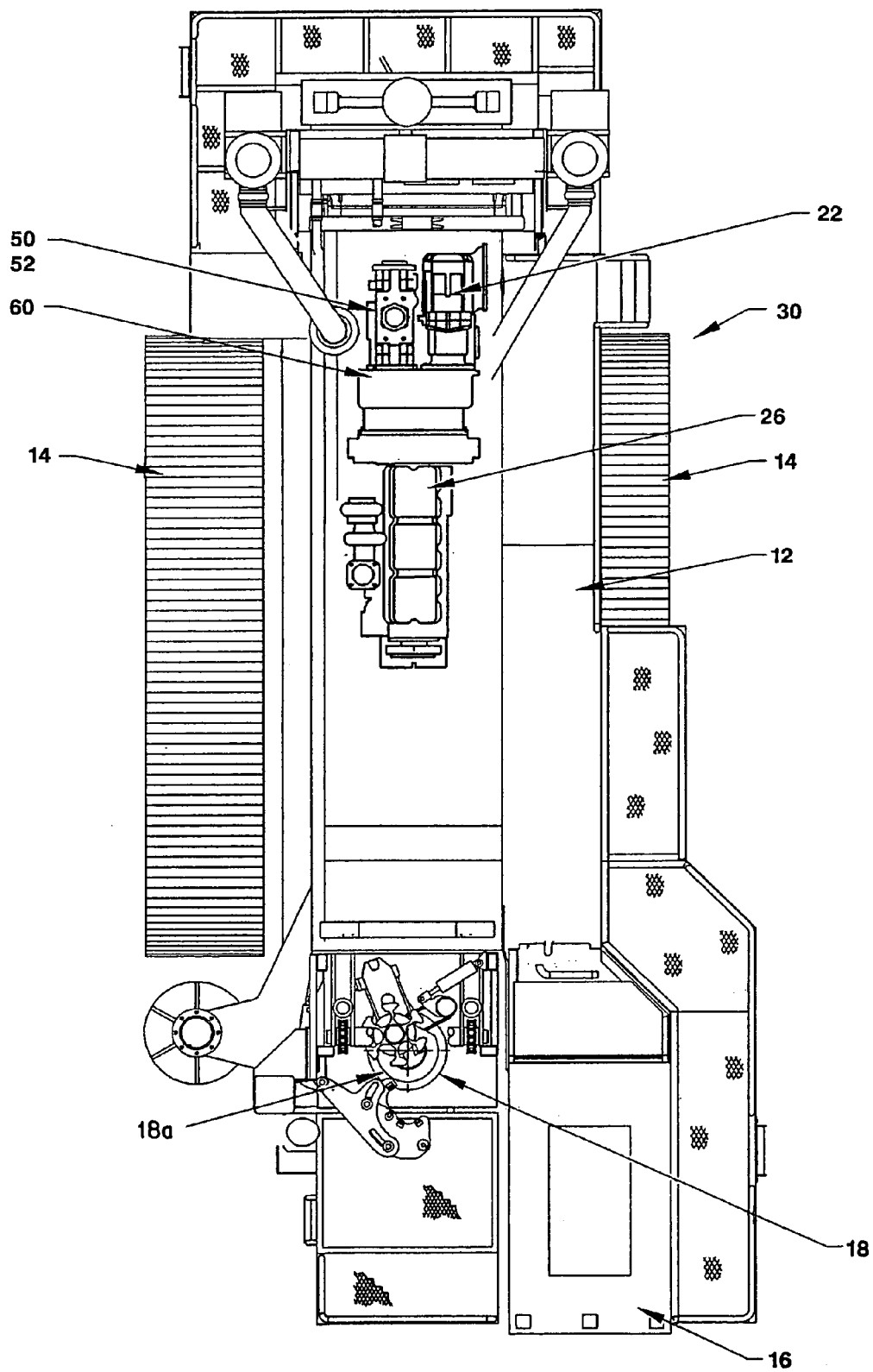
FIG. 5 is a plan view of a drilling rig according to the present invention.

Depicted in FIG. 5 is a drilling rig 30 on which the present invention is employed. That drilling rig is basically similar to that of FIG. 2 in terms of the overall equipment provided. That is, the drilling rig 30 includes a platform 12 to which a drivable ground support (e.g., tracks 14 or wheels) is attached. An operator's cab 16 is disposed at a rear end of the platform. Situated in front of the cab is a beam 18 whose lower end is connected to a fixed pedestal 18*a* and is swingable about a horizontal axis between a vertical state to a horizontal state in which the free end of the beam sits on a rest 20 situated at the front of the platform. The beam can be in the form of a mast which carries a carousel in which drill rods are stored. The mast 18 is swung by hydraulic devices 21 to an upright state during a drilling operation and to a horizontal state for tramming to a new work site. Mounted on the mast is a hydraulic mechanism for raising or lowering drill rods and rotating the carousel. Pressurized hydraulic fluid for actuating the hydraulic devices is provided by hydraulic pumps 50, 52.

A conventional screw compressor 22 is provided for providing compressed air to a drill bit in order to flush cuttings from a hole being drilled. The screw compressor comprises a male (drive) screw and a female (driven) screw arranged to mesh with the male screw, as is conventional, e.g., see the conventional screw compressor depicted in copending Ser. No. 10/147,883, filed May 20, 2002, which is incorporated by reference herein. The compressed air from the screw compressor is stored in an air reservoir 19 (FIG. 8) before being conducted to the drill string.

A motor 26 is provided for driving the screw compressor 22 and the hydraulic pumps 50, 52. The motor 26 can be any suitable conventional type such as an electric motor or a fuel-driven engine (such as a diesel engine).

In accordance with the present invention, a more compact arrangement of the motor 26, the compressor 22 and the pumps 50, 52 is provided, as well as a new pump drive lubrication technique.

Instead of providing separate gearboxes for the compressor and the hydraulic pump as in the prior art, there is provided a single gearbox 60. That gearbox includes an outer casing 61, having a flange 63 that is bolted to a flywheel housing 65 of the motor and forms an enclosed gear chamber. Each pump 50, 52 includes a flange 53 connected to the gearbox casing 61, and the compressor 22 includes a flange 55 connected to the casing 61.

A drive shaft 70 driven by the engine drives two coaxial drive gears 72, 74 disposed in the gear chamber. A first of those gears 72 constitutes a compressor drive gear in that it drives a gear 76 connected to a first of the screws of the compressor 22; that driver screw (male screw) then drives a second screw which meshes with the first screw. Air is compressed between the meshing screws.

The hydraulic pumps 50, 52 also include respective input shafts to which are connected gears 78, 80 respectively. Those gears are driven by the second drive gear 74, which constitutes a pump drive gear. The gear ratio between the compressor drive gear 72 and the compressor input gear 76 can be different than the gear ratio between the pump drive gear 74 and the pump input gears 78, 80, whereby the compressor can be driven at a different speed than the pumps.

In order to lubricate the gears in the gearbox 60, an oil input conduit 90 extends from the reservoir 19 to the gearbox 60 and the compressor 22 for conducting lubricating oil into the gear chamber and the compressor. The oil is conventional compressor oil that is normally used in screw compressors and which is substantially less viscous than gear oil that is normally used to lubricate the gears of a pump. The compressor oil has a viscosity grade no greater than about 1000 cSt at 30° F., and preferably is 750 cSt at 30° F. High pressure air, mixed with compressor oil, is conducted from the compressor 22 to the air reservoir 19 which separates the air from the oil. The separated compressor oil can be conducted to the compressor and to the gear housing through the conduit 90 due to a difference in pressure between the reservoir 19 and the gearbox 60. In the gearbox, the compressor oil, together with some pressurized air, is injected toward the meshing zones of the respective gears 72, 74, 76, 78, 80.

An oil output conduit 92 extends from the gear chamber to the compressor inlet for conducting the oil/air from the gearbox to the compressor inlet. Thus, a light stream of cool, fresh compressor oil is continuously circulated through the gearbox 60, and is sucked out of the gearbox by suction from the compressor or from a separate pump. The gearbox can thus be called a "dry" gearbox.

Alternatively, if the compressor oil exiting the gearbox is not to be delivered to the compressor air inlet, a separate suction pump could be used to suck the oil out of the gearbox.

The pump gearing, as well as the compressor gearing is thereby lubricated in a manner which minimizes power losses, facilitates start-up and avoids the need for oil replacement, in contrast to conventional pump drive gearboxes which are flooded with much heavier gear oil, e.g., typically having a viscosity grade of about 20,000 cSt at 30° F. Thus, by utilizing a gearbox that is common to the compressor and the pumps, the advantageous lubrication technique commonly employed in compressor gearboxes is available to the pump gears as well.

If desired, the engine 26 can be provided with a disconnect such as a clutch between the flywheel and the gearbox, to facilitate starting of the engine in cold weather. It would also be possible to provide the hydraulic pumps and/or the compressor with respective clutches, but that is not preferred, in order to minimize the number of parts and maximize the robustness of the system.

It will also be appreciated that by utilizing a common gearbox for compressor gears and pump gears, the length of the compressor/pump assembly can be considerably shortened as compared to conventional assemblies, thereby providing enhanced versatility in locating the center of gravity of such an assembly along the longitudinal dimension of the rig platform. That, in turn, provides greater opportunity to optimize the location of the load on the ground support by centering, or nearly centering that center of gravity relative to the ground support tracks (or wheels).

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An apparatus comprising:
   a hydraulic pump for pumping hydraulic fluid for power transmission;
   an air compressor lubricated by compressor oil;
   a gearbox common to the hydraulic pump and the air compressor and including an intermeshing gear arrangement for transmitting an inputted power to the hydraulic pump and the air compressor, the intermeshing gear arrangement comprising an input gear, a compressor drive gear, and a pump drive gear, the compressor drive gear and the pump drive gear being operatively connected with the input gear within the gearbox; and
   a source of the compressor oil;
   the gearbox including an oil inlet connected to the source of compressor oil, and an oil outlet, the oil inlet being at a higher pressure than the oil outlet, wherein compressor oil is circulated through the gearbox while inputted power is being transmitted to the gear arrangement.

2. The apparatus according to claim 1 further including a motor having a power output operably connected to the input gear of the gear arrangement for driving the hydraulic pump and the air compressor, the gearbox being coupled to a housing of the motor.

3. The apparatus according to claim 2, wherein the oil outlet is connected to a source of suction for sucking compressor oil out of the gearbox.

4. The apparatus according to claim 3 wherein the source of suction is an air inlet of the compressor.

5. The apparatus according to claim 4, further including an air reservoir coupled to an air outlet of the air compressor for receiving compressed air therefrom and for separating-out the compressor oil, the oil inlet of the gearbox being connected to the air reservoir for receiving compressor oil therefrom.

6. The apparatus according to claim 1 wherein said compressor drive gear is connected to a drive shaft, and said pump drive gear meshes with the compressor drive gear, the compressor drive gear and the pump drive gear being rotatable about mutually parallel axes.

7. The apparatus according to claim 1 wherein the air compressor comprises a screw compressor having a drive screw and a driven screw arranged in intermeshing relationship, the drive screw being joined to a drive shaft which is driven by said compressor drive gear of the gear arrangement.

8. The apparatus according to claim 1 wherein the hydraulic pump constitutes a first hydraulic pump, a second hydraulic pump being disposed next to the first hydraulic pump and the air compressor and being driven by the intermeshing gear arrangement in the gearbox.

9. The apparatus according to claim 1 wherein the oil outlet is connected to a source of suction for sucking compressor oil out of the gearbox.

10. The apparatus according to claim 9 wherein the source of suction is an air inlet of the compressor.

11. The apparatus according to claim 1, further including an air reservoir coupled to an air outlet of the air compressor for receiving compressed air therefrom and for separating-out the compressor oil, the oil inlet of the gearbox being connected to the air reservoir for conducting compressor oil therefrom to the gearbox.

12. The apparatus according to claim 1, further including means for supplying the compressor oil to the compressor independently of the pump.

* * * * *